(12) United States Patent
Vogel et al.

(10) Patent No.: US 7,860,667 B2
(45) Date of Patent: Dec. 28, 2010

(54) GAS MEASUREMENT SYSTEM

(75) Inventors: Tim Vogel, Independence, MO (US); Josiah Wiley, Raytown, MO (US); Jeff Beneke, Peculiar, MO (US)

(73) Assignee: Ruskin Company, Grandview, MO (US)

( * ) Notice: Subject to any disclaimer, the term of this patent is extended or adjusted under 35 U.S.C. 154(b) by 154 days.

(21) Appl. No.: 12/286,930

(22) Filed: Oct. 3, 2008

(65) Prior Publication Data

US 2010/0088044 A1 Apr. 8, 2010

(51) Int. Cl.
*G06F 19/00* (2006.01)
*G01F 1/68* (2006.01)

(52) U.S. Cl. .................... 702/45; 73/204.22
(58) Field of Classification Search .............. 702/45, 702/50; 73/204.22, 204.25
See application file for complete search history.

(56) References Cited

U.S. PATENT DOCUMENTS

| | | | | |
|---|---|---|---|---|
| 4,080,821 A | | 3/1978 | Johnston | 73/27 R |
| 4,345,463 A | * | 8/1982 | Wilson et al. | 374/36 |
| 4,494,406 A | | 1/1985 | Komons et al. | 73/204 |
| 4,581,930 A | | 4/1986 | Komons | 73/204 |
| 4,691,566 A | | 9/1987 | Aine | 73/204.26 |
| 4,835,521 A | * | 5/1989 | Andrejasich et al. | 340/521 |
| 4,916,948 A | | 4/1990 | Inada et al. | 73/202.5 |
| 4,942,763 A | | 7/1990 | Harpster | 73/202.5 |
| 4,969,357 A | | 11/1990 | Mickler | 73/204.11 |
| 5,058,426 A | | 10/1991 | Kobayashi | 73/204.26 |
| 5,181,420 A | | 1/1993 | Suzuki et al. | 73/204.15 |
| 5,184,500 A | * | 2/1993 | Krema et al. | 73/23.2 |
| 5,355,727 A | * | 10/1994 | McQueen | 73/204.25 |
| 5,419,190 A | | 5/1995 | Boyd | 73/204.25 |
| 5,606,513 A | * | 2/1997 | Louwagie et al. | 702/138 |
| 6,098,455 A | | 8/2000 | Nukui et al. | 73/204.26 |
| 6,905,242 B2 | | 6/2005 | Heuer et al. | 374/142 |
| 2003/0084718 A1 | | 5/2003 | Igarashi et al. | 73/204.22 |

FOREIGN PATENT DOCUMENTS

| | | |
|---|---|---|
| DE | 3841249 A1 | 7/1989 |
| EP | 1 193 477 A1 | 4/2002 |

* cited by examiner

*Primary Examiner*—Bryan Bui
(74) *Attorney, Agent, or Firm*—Jeffrey A. Thurnau, Esq.; Paul M. Dunlap, Esq.; Thomas A. Dougherty, Esq.

(57) ABSTRACT

A gas measurement system comprising a probe (10), the probe (10) comprises a sensor circuit comprising a thermal dispersion sensor (23) and a reference thermistor (24), the thermal dispersion sensor and the reference thermistor are disposed within a shroud (20), the shroud partially enclosing the thermal dispersion sensor and the reference thermistor such that a gas flow through the shroud is substantially representative of the gas flow through a gas duct, the probe further comprises an elongate member (27) having an aerodynamic form, the shroud is mounted to the elongate member, the elongate member mountable within the gas duct, and a microprocessor for receiving a signal from the thermal dispersion sensor and the reference thermistor, the microprocessor calculating and displaying a gas velocity and gas temperature.

17 Claims, 13 Drawing Sheets

GAS MEASUREMENT SYSTEM

FIELD OF THE INVENTION

The invention relates to a gas measurement system, and more particularly, to a gas measurement system for installation in a duct and having a probe comprising a thermal dispersion type sensor and a reference thermistor disposed within a shroud thereon, the shroud having a rectangular entry area for controlling the gas flow past the thermal dispersion type sensor and the reference thermistor.

BACKGROUND OF THE INVENTION

There are many different types of flowmeters for measuring velocity of a fluid. The term "fluid" refers gas flow. One category of flowmeter is known as a "thermal" flowmeter. There are two general types of thermal flowmeters. In one type, a flow pipe is employed with a passage for the fluid flow to be measured. One or more electric heaters are located in the flow or the sensor pipe. The heaters apply heat to the fluid as it flows through the sensor pipe. The temperature is measured at two different points in the sensor pipe. The difference in the temperature between the upstream and downstream points can be correlated to velocity.

In the second category of thermal mass flowmeters, a heater/temperature sensor is positioned on a boom and immersed into the flowing fluid stream. A circuit senses the temperature response of the sensor as a function of the mass fluid flow rate.

In each case the rate of heat flow into the fluid from the sensor is directly proportional to the mass flow rate of the fluid. The accuracy of these flowmeters is limited to a relatively narrow range of flow velocities. With low velocities, accuracy is limited by spurious heat losses due to convection and leakage into the environment. For high velocities, accuracy is limited by the finite thermal resistance of the sensor element or elements.

In order to avoid the high velocity range limitation, a common technique is to use a main pipe within which are contained laminar flow elements. These laminar flow elements are arranged to produce a certain pressure drop for the desired range of velocities to be measured. The pressure difference upstream and downstream of the laminar flow elements is proportional to the volume flow rate of the fluid to be measured. A sensor pipe branches off from the main pipe and reenters downstream. This sensor pipe carries heating elements and sensors. A much smaller fluid flow will flow through the sensor pipe than the main pipe. The velocity of the flow in the sensor pipe is measured, it being proportional to the main velocity flowing through the main pipe. In other cases a sensor pipe is not used and instead the sensor elements are positioned within the main duct.

Representative of the art is U.S. Pat. No. 5,419,190 which discloses a method and apparatus for measuring mass flow rates and other characteristics of a fluid in a large conduit uses a sensor circuit having a heater/thermometer, a reference resistor, and a thermometer resistor arranged in four-wire network to enable measurement of all characteristics of the resistor network. That sensor circuit is preferably mounted on an interior wall surface of a support tube. A plurality of such support tubes, each having a plurality of sensors within the support tube, are mounted in an array in the cross section of the duct. A cleaning plate for cleaning the exterior surface of the support tube permits calibration of the network while cleaning. A program for using the circuit to calculate values of interest and to display desirable output data is also disclosed, as is a program for controlling the cleaning/calibration cycle.

What is needed is a gas measurement system for installation in a duct and having a probe comprising a thermal dispersion type sensor and a reference thermistor disposed within a shroud thereon, the shroud having a rectangular entry area for controlling the gas flow past the thermal dispersion type sensor and the reference thermistor. The present invention meets this need.

SUMMARY OF THE INVENTION

The primary aspect of the invention is to provide a gas measurement system for installation in a duct and having a probe comprising a thermal dispersion type sensor and a reference thermistor disposed within a shroud thereon, the shroud having a rectangular entry area for controlling the gas flow past the thermal dispersion type sensor and the reference thermistor.

Other aspects of the invention will be pointed out or made obvious by the following description of the invention and the accompanying drawings.

The invention comprises a gas measurement system comprising a probe, the probe comprises a sensor circuit comprising a thermal dispersion sensor and a reference thermistor, the thermal dispersion sensor and the reference thermistor are disposed within a shroud, the shroud partially enclosing the thermal dispersion sensor and the reference thermistor such that a gas flow through the shroud is substantially representative of the gas flow through a gas duct, the probe further comprises an elongate member having an aerodynamic form, the shroud is mounted to the elongate member, the elongate member mountable within the gas duct, and a microprocessor for receiving a signal from the thermal dispersion sensor and the reference thermistor, the microprocessor calculating and displaying a gas velocity and gas temperature.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
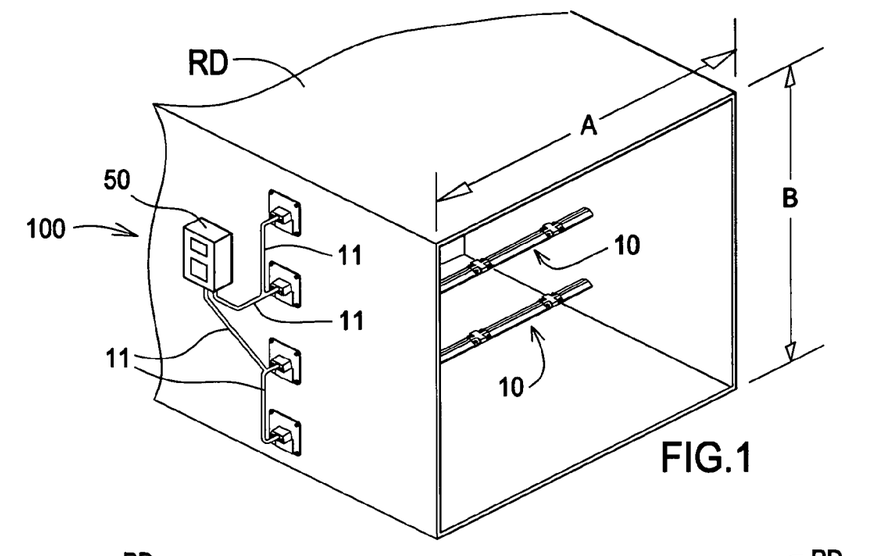
FIG. 1 is a perspective view of the system installed in a duct.
Figure 2A:
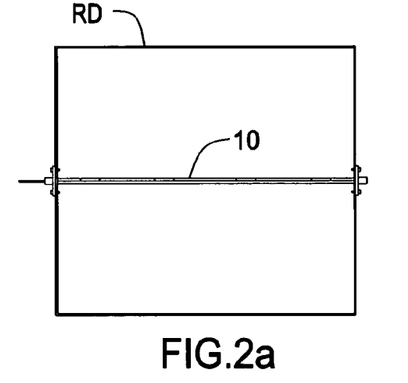
FIG. 2a, 2b, 2c and 2d are front views of the system installed in a rectangular duct using different numbers of probes.
Figure 2B:
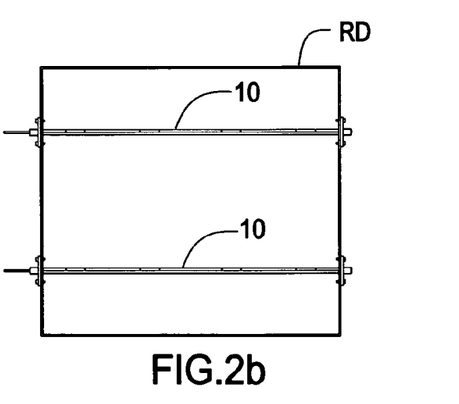
Figure 2C:
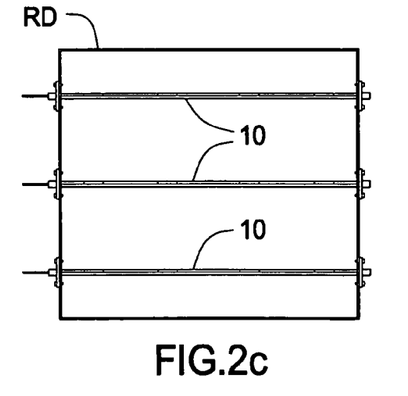
Figure 2D:
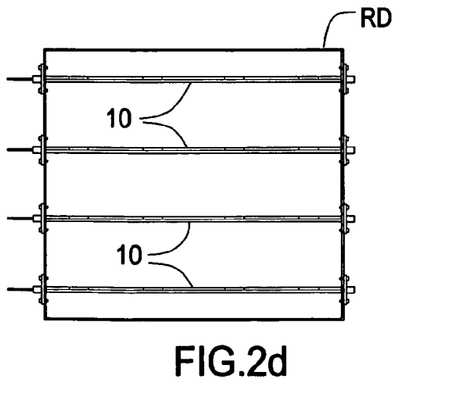
Figures 3A, 3B:
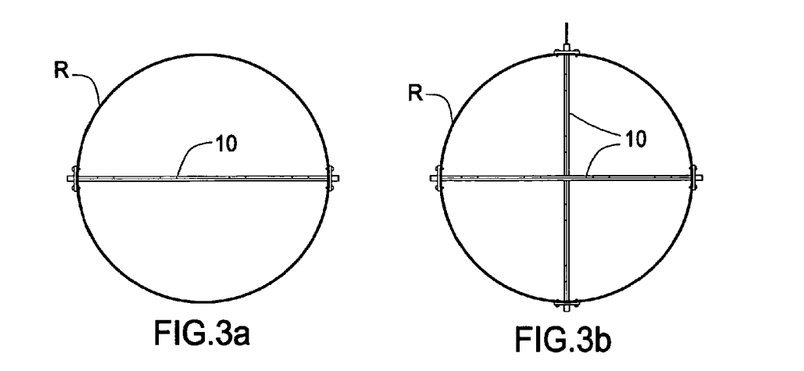
FIG. 3a, 3b, 3c and 3d are front views of the system installed in a round duct using different numbers of probes.
Figures 3C, 3D:
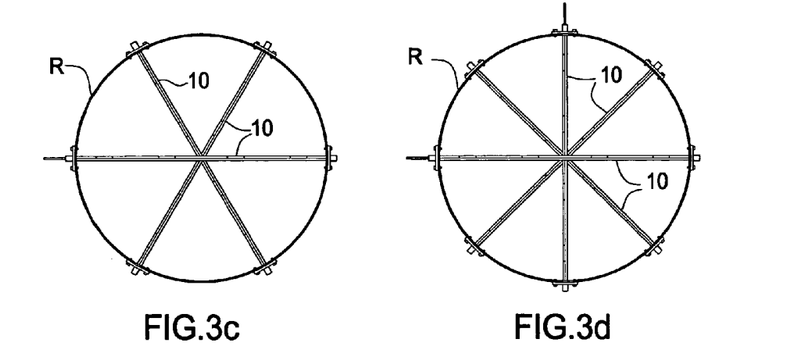

FIG. 1 is a perspective view of the system installed in a duct. The gas flow measurement system comprises one or more probes 10 disposed within a duct RD. The duct RD may have dimensions A×B. The gas flowing through the duct may comprise atmospheric air, or any other gaseous material. In the preferred embodiment the system is installed in a residential or commercial HVAC system. Each probe 10 is electrically connected 11 to a microprocessor 50. The transmitter has a 4 port RJ45 connector that terminates with each measurement probe. Each of the measurement probes has a RJ45 connector on the end of the extrusion. Cat5e network cable is used to make the connection between each probe and the transmitter.

FIG. 2a, 2b, 2c and 2d are front views of the system installed in a rectangular duct using different numbers of probes. Each system installation may use a single probe 10 as in FIG. 2a, or two probes as in FIG. 2b, or three probes as in FIG. 2c, or four probes as in FIG. 2d. The number of probes shown in FIG. 2a, 2b, 2c and 2d are not intended to limit the number of probes which may be used in a system, for example, a particularly large duct may require more than 4 probes. The array for probes 10 are parallel as viewed in the direction of the gas flow.

FIG. 3a, 3b, 3c and 3d are front views of the system installed in a round duct using different numbers of probes. In these figures the duct R is round. The array for probes 10 forms a cross as viewed in the direction of the gas flow.

Figure 4:
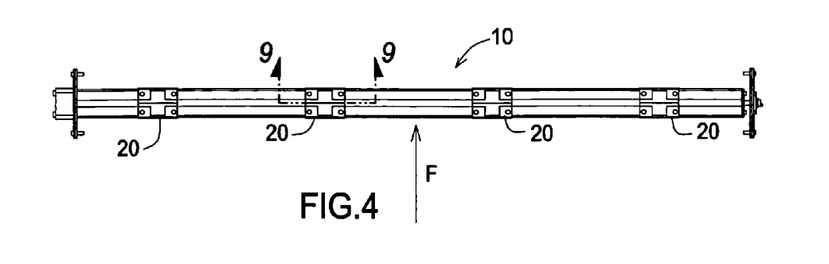
FIG. 4 is a top view of a probe.

FIG. 4 is a top view of a probe. Probe 10 comprises one or more shrouds 20 disposed along the length of the probe. Each shroud 20 contains or encloses a thermal dispersion type sensor, also known as a thermistor. The resistance of the thermal dispersion type sensor varies according to its temperature, which is a function of the gas velocity flowing pass the thermal dispersion type sensor. Thermistors can be classified into two types. In a first type, the resistance increases with increasing temperature, and the device is called a positive temperature coefficient (PTC) thermistor, or posistor. In a second type, the resistance decreases with increasing temperature, and the device is called a negative temperature coefficient (NTC) thermistor. Both may be used in the inventive system.

Figure 5:
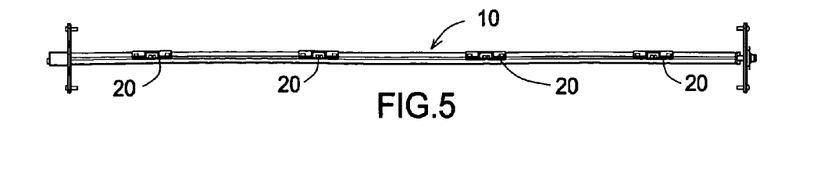
FIG. 5 is a front view of the probe in FIG. 4.

FIG. 5 is a front view of the probe in FIG. 4. This front view is from the perspective of the direction of the gas flow. In other words the gas flow is normal to the drawing plane.

Figure 6:
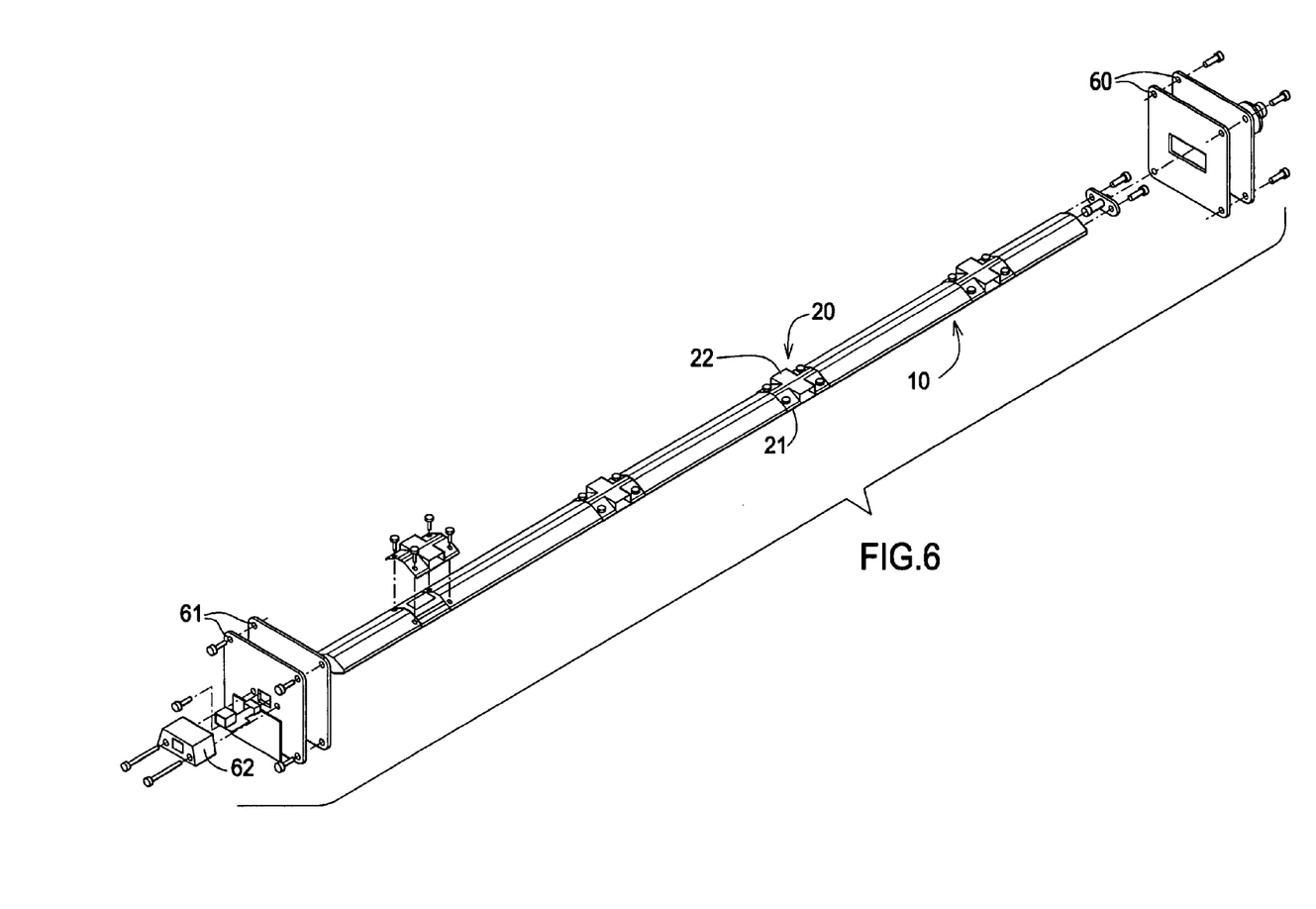
FIG. 6 is a perspective view of a probe.

FIG. 6 is a perspective view of a probe. Each shroud 20 comprises a first portion 21 and second portion 22. Each portion 21, 22 encloses a thermal dispersion type sensor, see FIG. 7. Plates 60, 61 are used to secure probe 10 within a duct RD. Fixtures 62 are for routing circuit wires from external through the plates 60, 61 to probe 10.

Figure 7:
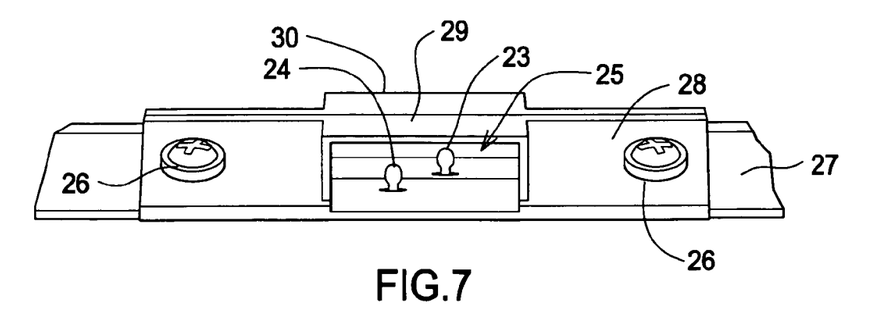
FIG. 7 is a top perspective view of a sensor shroud.

FIG. 7 is a top perspective view of a sensor shroud. Thermal dispersion type sensor 23 and reference thermistor 24 are disposed within the shroud 20. Reference thermistor 24 senses the ambient temperature of the gas flowing past. Thermistor 24 may also be referred to as a "sensor" in this specification. Each pair of sensors (23, 24) may also be referred to in this specification as a "sensor node" or "sensor pair".

Shroud 20 does not fully enclose sensor 23 and reference thermistor 24. Shroud 20 guides the gas flow through shroud conduit 25 so that the gas impinges predictably upon the sensor 23 and reference thermistor 24. Simply exposing the bare sensors to the flow in the duct may subject them to swirls and eddies induced by probe 10 or other obstructions which can alter the accuracy of the measurement. Instead; shroud 20 meters and guides the gas flow so it is not significantly altered as to pressure or flow, thereby delivering a gas flow through the shroud to the sensor 23 and reference thermistor 24 that is representative of the flow rate (CFM) of the total gas flow within the larger duct. Gas flows in direction "F" (FIG. 12) impinging upon and passing through shroud 20 and conduit 25. Shroud conduit 25 comprises a rectangular entry area cross-section (x,y). The area (x,y) is significantly less than the area of the duct RD in which the shroud is located. The rectangular entry area directs and controls the gas flow past sensors 23, 24 in order to reduce or eliminate flow fluctuations which may give a false reading. Fasteners 26 affix the shroud 20 to the elongate member 27.

Figure 8:
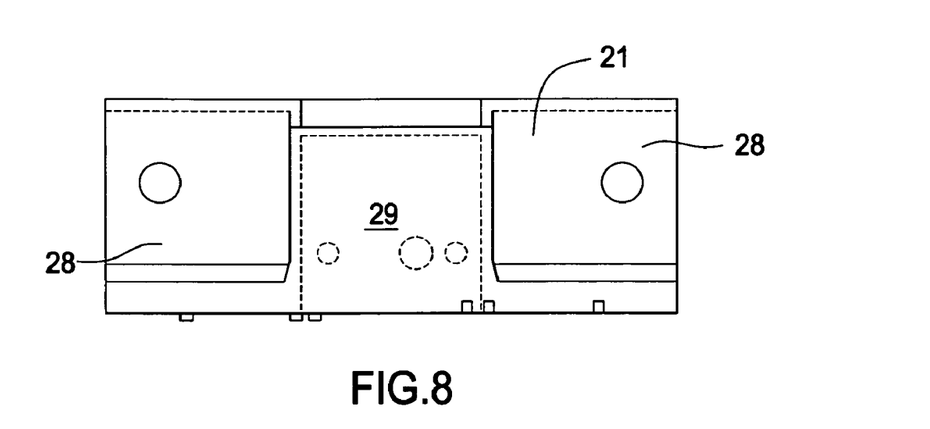
FIG. 8 is a top plan view of a sensor shroud.
Figure 8A:
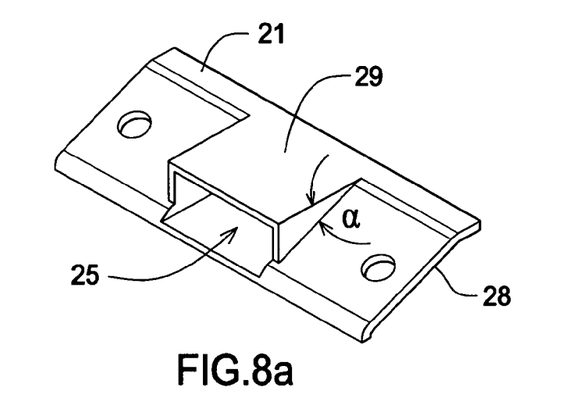
FIG. 8a is a front perspective view of a sensor shroud.

FIG. 8 is a top plan view of a sensor shroud. FIG. 8a is a front perspective view of a sensor shroud. Surface 28 and surface 29 describe an included angle $\alpha$ in the range of approximately 20° to 30°. Surface 29 is parallel to the gas flow direction F, see FIG. 4.

Figure 8B:
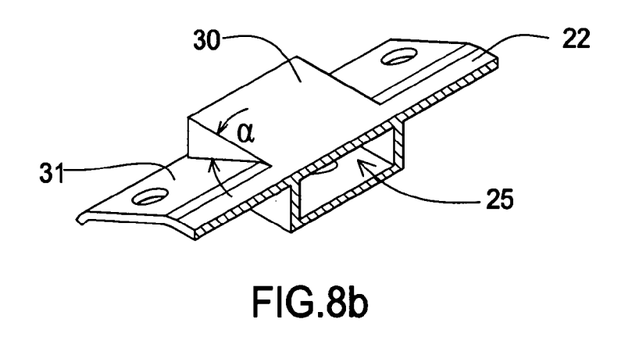
FIG. 8b is a rear perspective view of a sensor shroud.

FIG. 8b is a rear perspective view of a sensor shroud. Surface 30 and surface 31 describe an included angle $\alpha$ in the range of approximately 20° to 30°. Surface 30 is parallel to the gas flow direction F, see FIG. 4.

Figure 9:
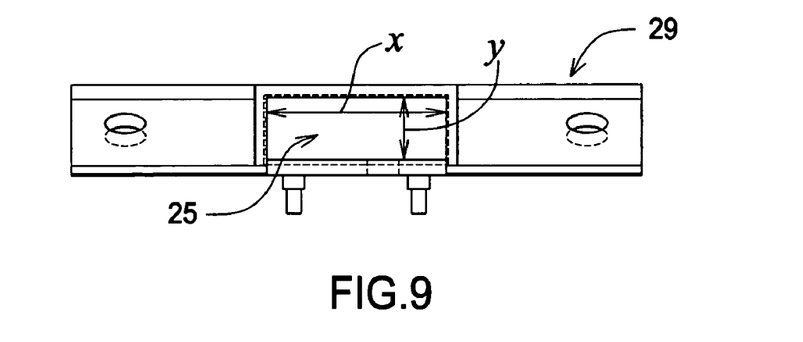
FIG. 9a is a top view of a sensor shroud.
FIG. 9b is a front view of a sensor shroud.

FIG. 9a is a top view of a sensor shroud. Portion 21 in plan view is substantially rectangular.

FIG. 9b is a front view of a sensor shroud. Conduit 25 is the path by which the gas passes through the shroud 20.

Figure 10:
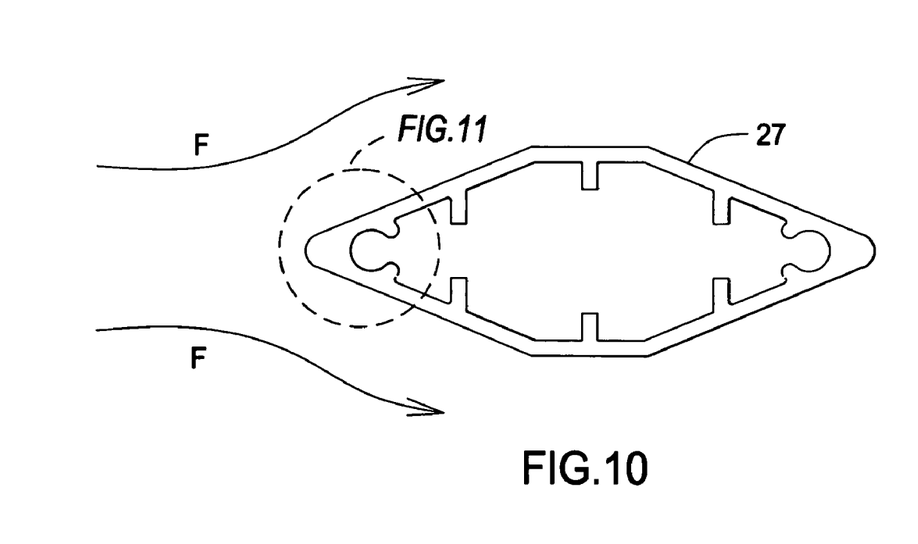
FIG. 10 is a cross-sectional view of the airfoil.

FIG. 10 is a cross-sectional view of the airfoil member. Member 27 comprises an aerodynamic cross-section. The cross-section offers minimal resistance to the gas flowing through the duct. The gas flow F passes the member 27 with minimal disturbance as well. This in turn serves to diminish any adverse effect the presence of the probes in the duct may have on the gas flow, for example, this cross-section minimizes any effect that might otherwise be realized through an otherwise unnecessary increase in the system fan static pressure capacity.

Figure 11:
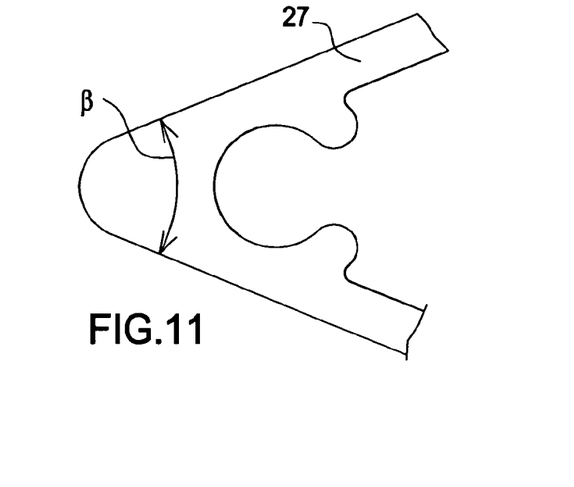
FIG. 11 is a detail of FIG. 10.

FIG. 11 is a detail of FIG. 10. The included leading edge angle $\beta$ is in the range of 40° to 60°.

Figure 12:
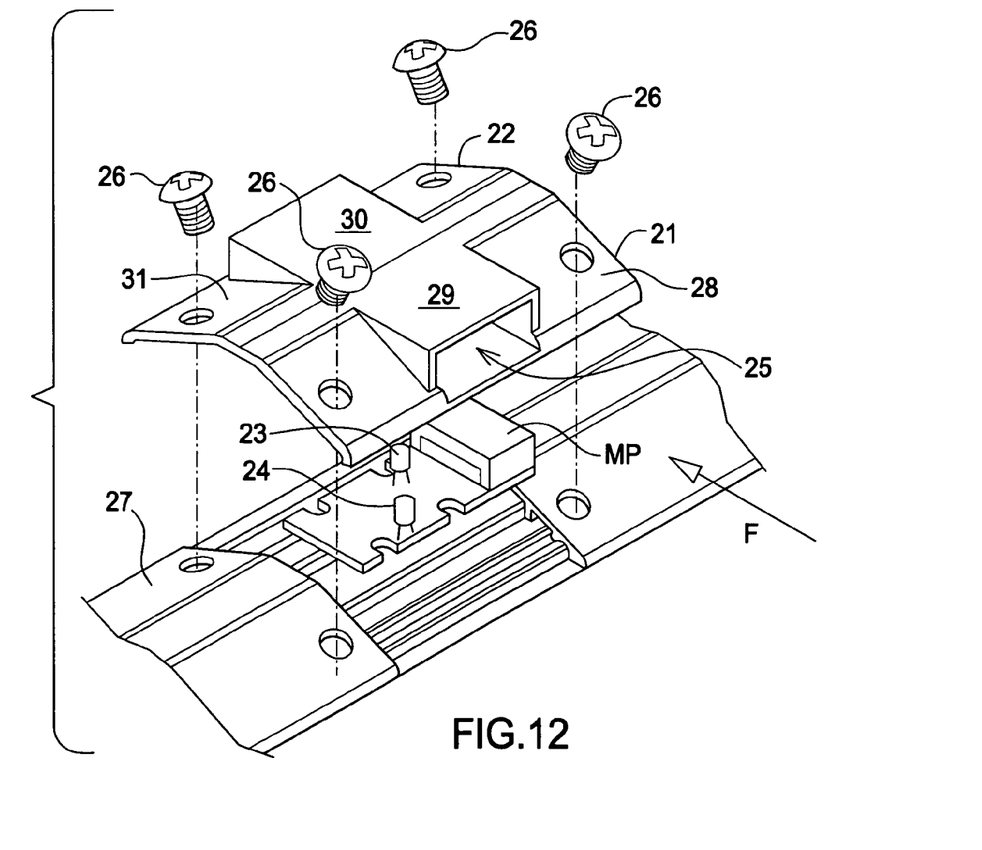
FIG. 12 is a perspective view of a sensor shroud installation on an airfoil.

FIG. 12 is a perspective view of a sensor shroud installation on an airfoil member. Fasteners 26 affix shroud portions 21 and 22 to the member 27.

Member 27 may comprise any material suitable for gas flow service, including aluminum, metal, plastic or any combination thereof.

Figure 13:
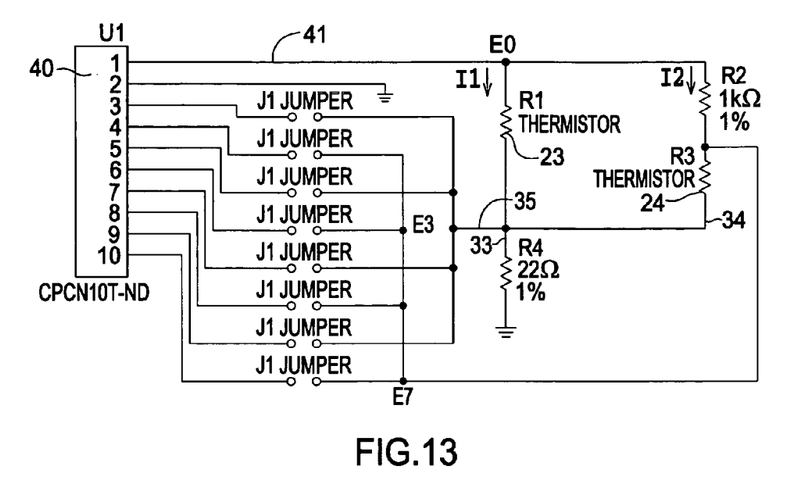
FIG. 13 is a sensor circuit schematic.

FIG. 13 is a sensor circuit schematic. A microprocessor/power supply 40 is connected at the terminal E0 in circuit with the lead 41 having a lead resistance RL1 and provides a sufficient current through the series circuit comprising lead 41, thermistor R1, and lead 33 having a lead resistance RL2 through a thermistor R1, functioning as a current reference resistor.

Resistor R2 and thermistor R3 are connected in series and the series connection of resistor R2 and thermistor R3 is connected in parallel with R1. The common connection between the resistor R2 and thermistor R3 is connected by a lead 34 with its associated lead resistance RL3 to a terminal E7. The common connection between the resistor R1, thermistor R3, and the lead 33 is also connected to a lead 35 having a lead resistance RL4 and connects to the terminal E3.

Each thermistor and reference thermistor is also referred to as a sensor node. Each shroud 20 encloses a sensor node. Each sensor node shall contain its own microprocessor. The microprocessor will store the sensor (23,24) calibration data and calculate the airflow at each sensor node through the shroud.

After calculating the air flow, the microprocessor at each sensor node will relay the information to the main circuit board through a digital network. This will prevent the need to match each sensor (23, 24) in the node with the correct input on the control panel.

A main circuit board will read the data from each of the sensors and calculate the gas velocity. One 4-20 mA signal is proportional to the air velocity, and one 4-20 mA signal is proportional to air temperature. These signals are communicated to a building HVAC automation system. It is possible to control a control damper with the temperature output by enabling this feature in an interface menu. A setpoint is set using the interface menu. A resistor can be used to convert the 4-20 mA signal to 2-10 VDC.

A 24 VAC transformer will provide the required power to operate the circuit.

In operation, the voltage from the power supply 40 connected to the terminal E0 provides sufficient current through the lead 41, the thermistor R1, lead 33 and resistor R4 to cause significant self-heating in R1, for example, a temperature rise of 10° C. Typical circuit values are R1=50 ohms at 0° C.; R2=1000 ohms; R3=100 ohms at 0° C.; R4=22 ohms; and E0=12 volts.

Resistor R1 and thermistor R3 have a precise high temperature coefficient of resistance such as presented by a positive coefficient thermistor. Resistors R2 and R4 have a very low temperature coefficient, typically less than 5 ppm/degrees C. The current flow I1 causes a voltage drop across R1 which is identical to the voltage drop across R2 and R3, and thus impresses a current flow I2 through R2 and R3.

When current flows through a thermistor, it generates heat, which raises the temperature of the thermistor above ambient. As air moves across the heated thermistor, the resistance of the thermistor changes the power dissipation. The rate of transfer is described by Newton's law of cooling:

$$PE = K(T(R) - TO)$$

Where T(R) is the temperature of the thermistor as a function of its resistance R, T0 is the temperature of the surroundings, and K is the dissipation constant, usually expressed in units of milliwatts per ° C. R1 of the above circuit represents the self heated thermistor (23) and R3 represents the reference thermistor (24).

The first step in calculating air velocity is to determine the ambient air temperature. For accurate temperature measurements, the resistance/temperature curve must be determined. The Steinhart-Hart equation is a widely used third-order approximation:

$$\frac{1}{T} = a + b\ln(R) + c\ln^3(R)$$

Where a, b and c are called the Steinhart-Hart parameters, and must be specified for each thermistor. T is the temperature in Kelvin and R is the resistance in ohms. The following coefficients are provided by the manufacture of the thermistor for the Steinhart-Hart equation:

| a = | 0.00186819 |
|---|---|
| b = | 0.00031476 |
| c = | 0.00000034 |

The ambient air temperature can be calculated using the Steinhart-Hart equation solving for T. Subtracting 273.15 converts the value to degrees Celsius.

$$T = \left(\frac{1}{a + b\ln(R) + c\ln^3(R)}\right) - 273.15$$

Once the ambient air temperature is known, the air velocity can be calculated using Newton's law of cooling and solving for the dissipation constant.

$$PE = K(T(R) - TO)$$

$$W/°C."K" = \frac{PE}{(\text{Self Heated Temperature})}$$
$$(\text{Reference Temperature})$$

$$W/°C. = \frac{PE_{R2}}{\left(\frac{1}{a + b\ln(R2) + c\ln^3(R2)} - 273.15\right) - \left(\frac{1}{a + b\ln(R3) + c\ln^3(R3)} - 273.15\right)}$$

Once the self heated power dissipation is determined, the air velocity can be calculated using a fourth order polynomial. The forth order polynomial is derived from testing on a wind tunnel at various velocities.

$$y = -0.2467x^4 + 9.2836x^3 - 85.639x^2 + 339.39x - 485.54$$

R2=0.9999

Where x represents the power dissipation and y represents the velocity. The values for each of the variables in the noted equations are examples and are not intended to limit the breadth of the invention as claimed.

Due to the negative temperature coefficient of thermistors (23,24) the current draw is largest when there is no airflow. In the preferred embodiment the maximum current draw per sensor will be approximately 56.2 mA or 500 mA per probe (10) or approximately 121 mA per sensor (thermistor). With a maximum of 4 sensors per transmitter the total current draw for the sensors without flow will be approximately 2 amps.

Figure 14:
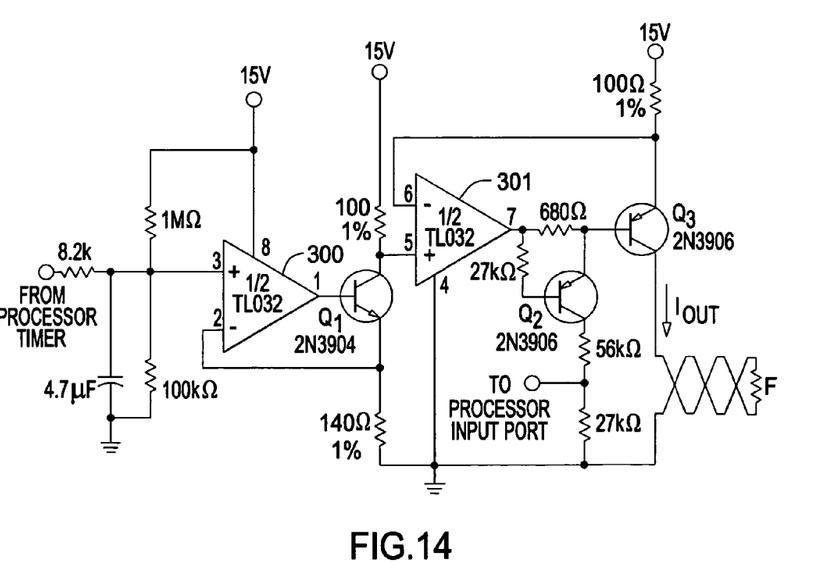
FIG. 14 is a schematic of the current output circuit in the transmitter circuit.

Referring to FIG. 14, there are two 4-20 mA op amp output circuits on the transmitter board. One output is proportional to the measured velocity and one output is proportional to the measured air temperature, see FIG. 14 which is a schematic of the current output circuit in the transmitter circuit.

The circuit delivers its drive from the pulse width modulation (PWM) of the microprocessor. The duty cycle of the PWM determines the output current of the circuit. The RC network in front of the first op-amp 300 conditions the pulse from the processor into a constant 0-5 VDC. In addition, the network ensures that the minimum input voltage to op amp 300 is close to 100 mV, even if the input is at ground potential.

This minimum voltage ensures that the feedback loop of op amp 300 does not return to the positive rail when transistor Q1 is off.

The emitter resistor of Q1 sets the current span of the circuit. A potentiometer was used in place of the resistor for calibration of the circuit. With a 5V drive from the microcontroller, the output current is 20 mA. A grounded input results in less than 1 mA. A duty cycle of 12.5% drives the loop at 4 mA and exhibits linear control to full scale.

The purpose of the second operational amplifier 301 is to provide a current source, and a grounded return path for the current loop. The PNP transistor Q3 provides this high side drive. The open loop feedback portion of this circuit lets the microcontroller know that a fault condition exists on the line. The processor can then indicate the status of the analog outputs on the LCD.

When an open-loop condition occurs, Q3 shunts the entire loop current back through its emitter base junction and through the 680 ohm resistor to the op amp. The voltage developed across the 680 ohm resistor turns on Q2, resulting in a logic one feedback to the microcontroller.

Op-amp selection is important when using, a single supply topology. An operational amplifier that can maintain stability close to its negative, or ground, rail is important.

Figure 18:
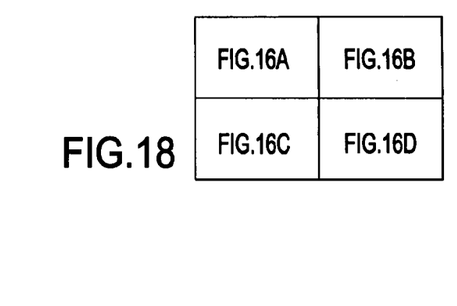
FIG. 18 is a layout for FIGS. 16a, 16b, 16c, 16d.

FIGS. 16a, 16b, 16c, 16d is a schematic of the transmitter circuit. FIG. 18 is a layout for FIGS. 16a, 16b, 16c, 16d. With the large amount of current required for the sensors, 3 amperage diodes (D1, D2) are required to supply the proper amount of current in the half wave rectification circuit. Using diodes with a smaller current rating may cause the circuit to fail with inrush current when the circuit turns on. Two 1000 uF capacitors (C1, C2) are used to filter the half wave rectification into a constant 34 VDC. A buck regulator (LM2595) (U2,U8) is used to step the voltage down to 12 VDC. This prevents the 5 volt regulator (U1) from going into thermal shutdown.

A 2.5 amp fast acting fuse (F1) is utilized to protect the electronics. In the event that a user wires the transmitter incorrectly, the fuse will blow protecting the circuit.

The transmitters include a 16×2 character LCD display (U4) that indicates airflow, temperature and system status. The display is used during configuration and diagnostic modes. Field configuration is accomplished using a simple four-button interface on the main circuit board. Individual airflow and temperature measurements can be displayed by scrolling through the sensors using the up and down interface buttons. The airflow output signal is filtered using the LCD (U4) and 4 button interface (SW2, SW3, SW4, SW5, see FIG. 15). The filter takes place in microprocessor software. A potentiometer (R8) is used to set the LCD contrast.

The offset and gain is set using the four button interface. The offset and gain is applied by the software in the microprocessor, see U5 of FIG. 16.

Each probe contains a microprocessor, in this case an Atmega 32L-8MU-ND. Each microprocessor (U5) utilizes the ADC to read each of the analog values from the sensor circuit (FIG. 13). Microprocessor (U5) on the transmitter circuit communicates with each multiplexer (FIG. 17) in the probe 10 by serial peripheral communication "SPI".

Figure 15:
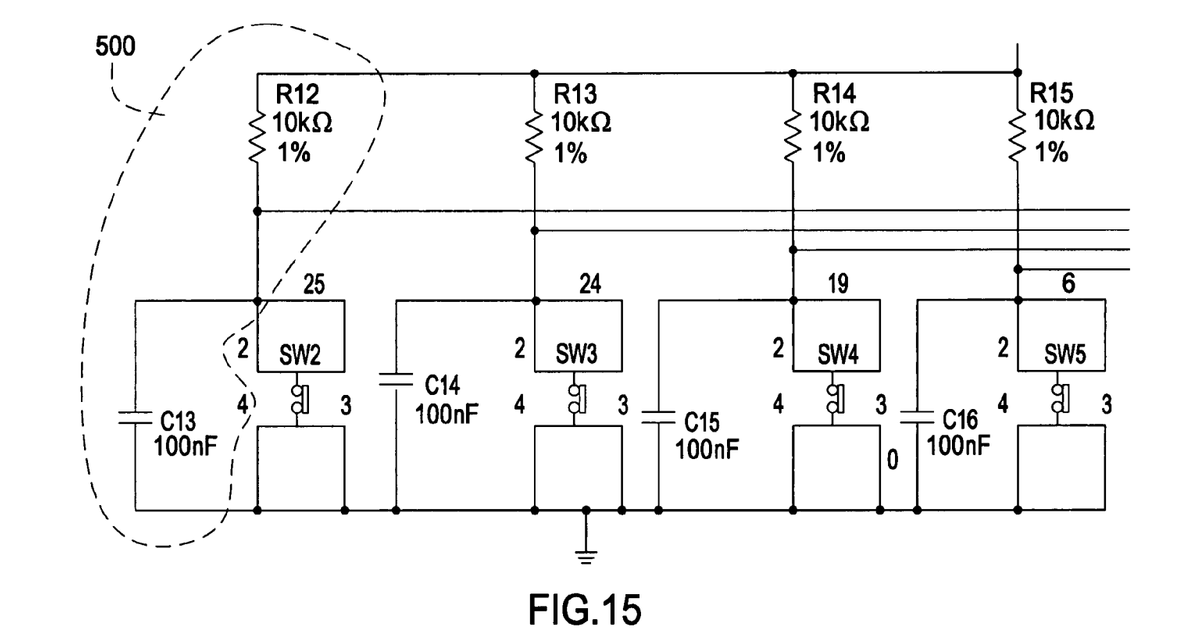
FIG. 15 is a schematic of the de-bounce circuit in the transmitter circuit.
Figure 16A:
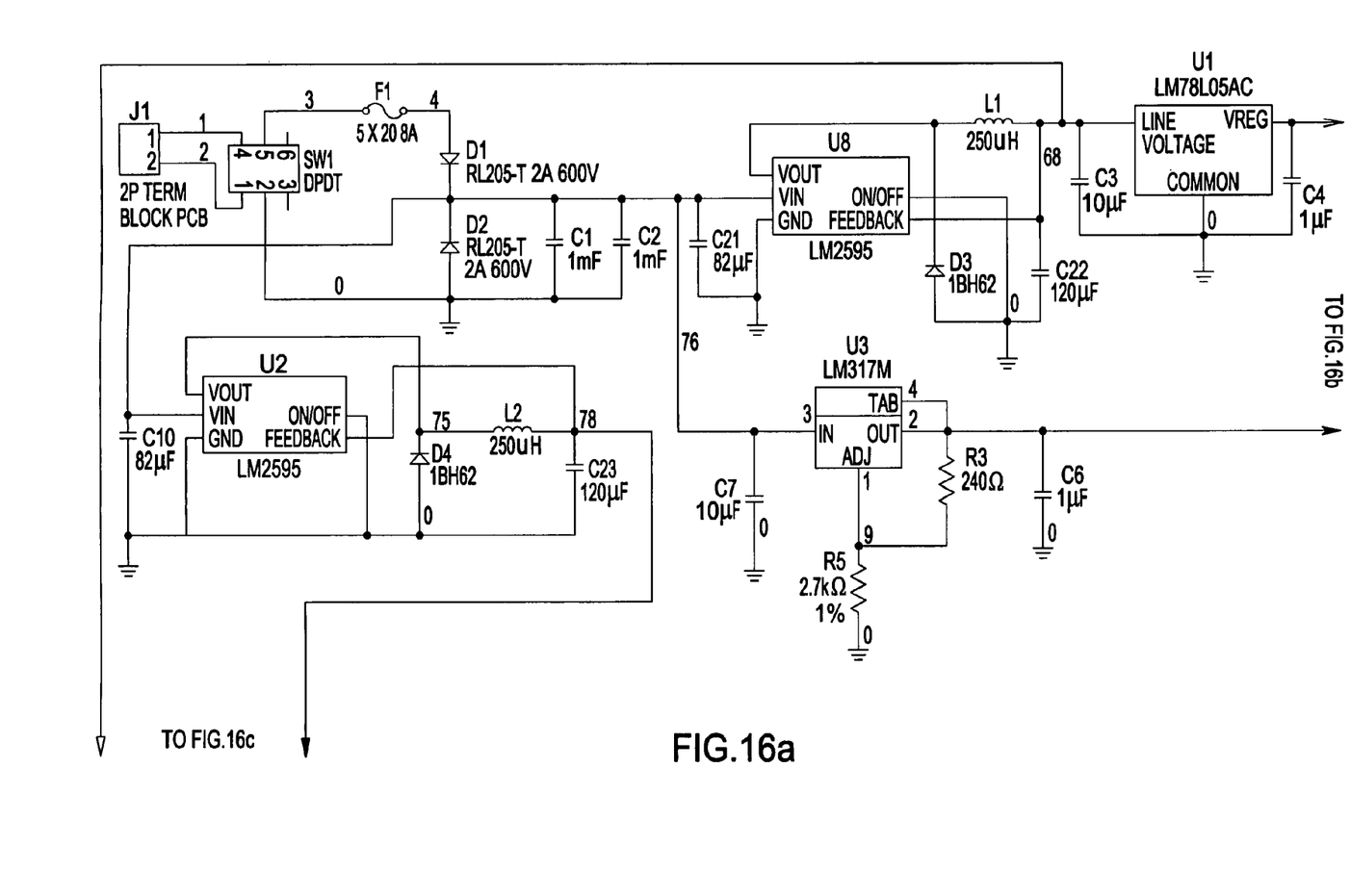
FIGS. 16a, 16b, 16c, 16d are a schematic of the transmitter circuit.
Figure 16B:
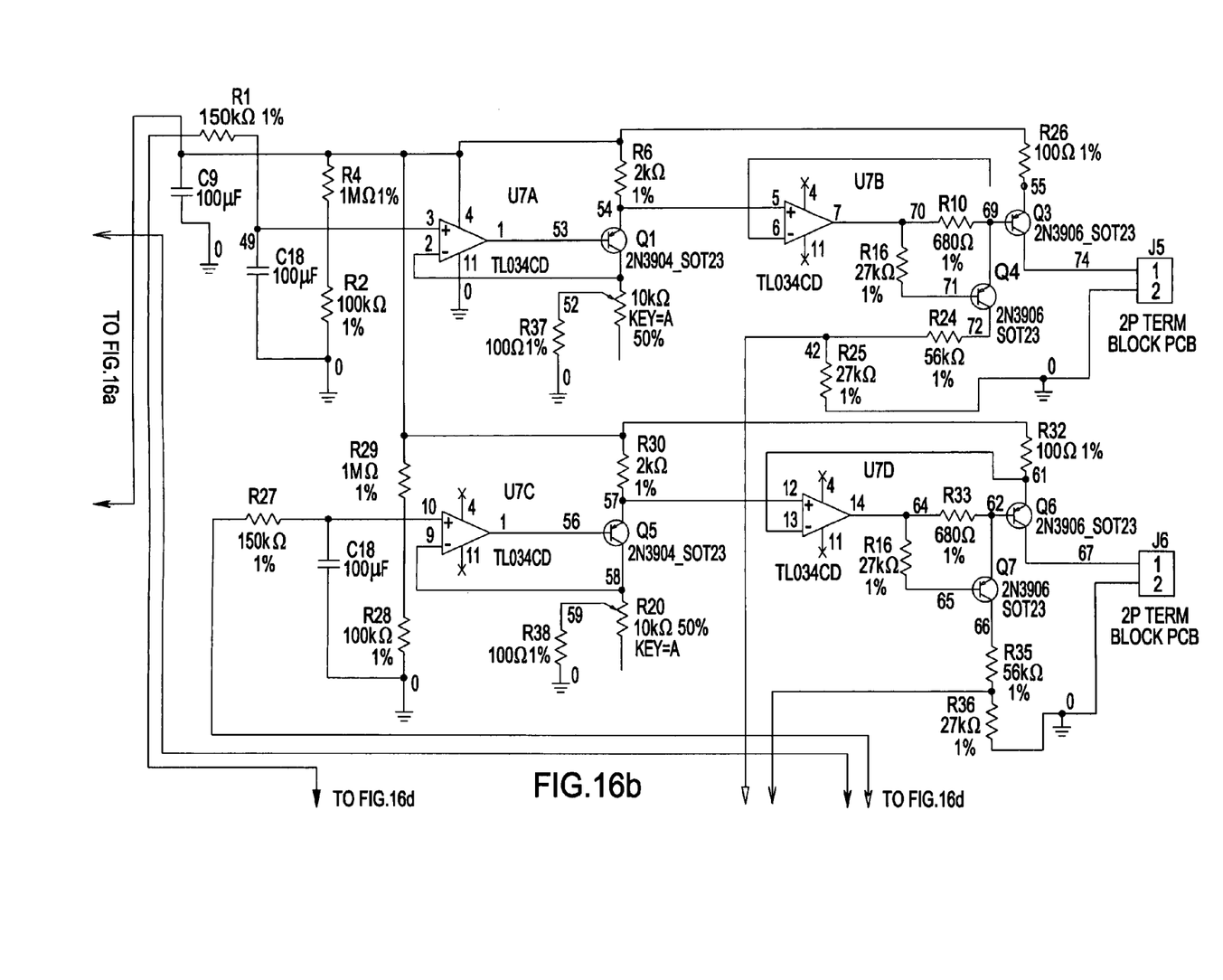
Figure 16C:
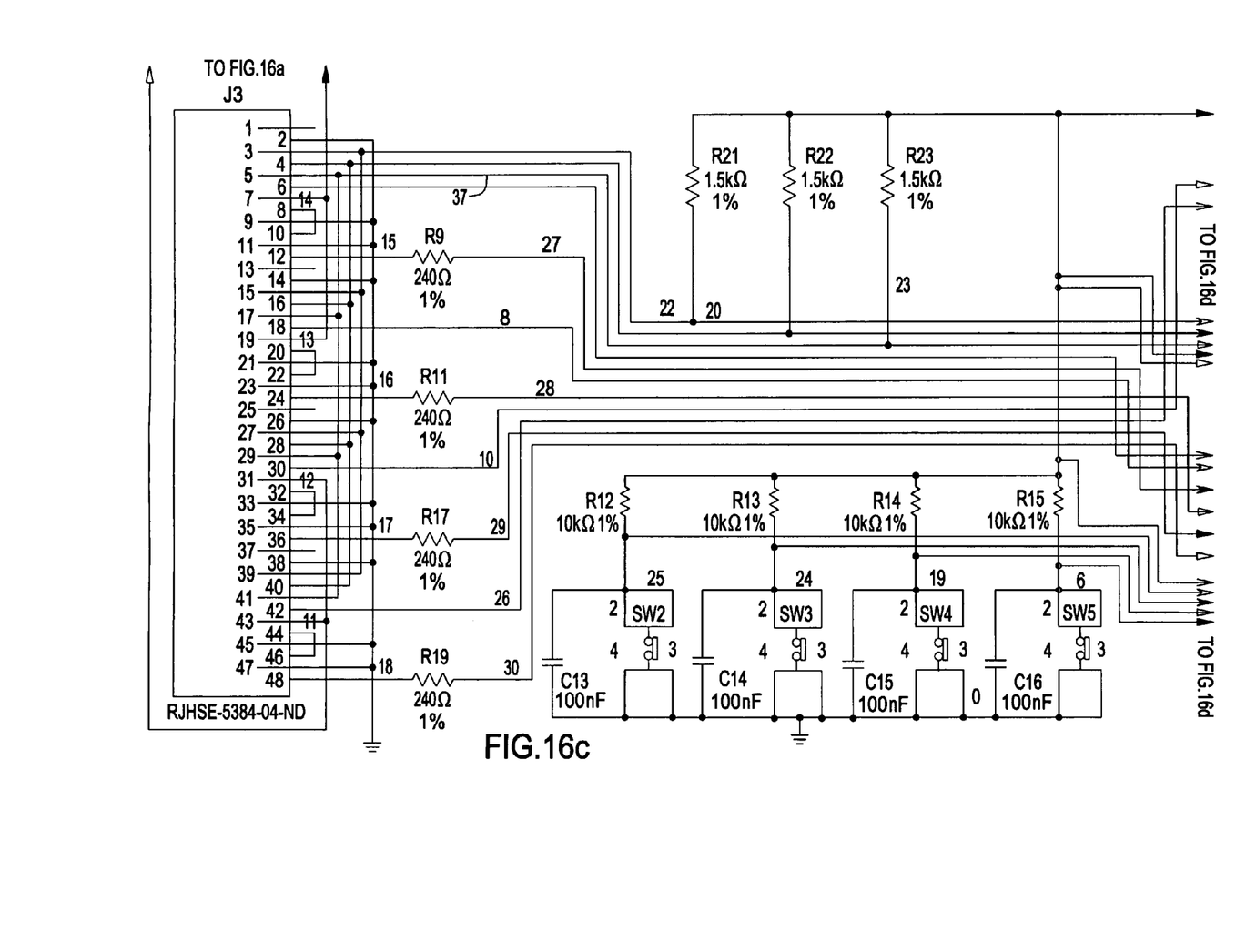
Figure 16D:
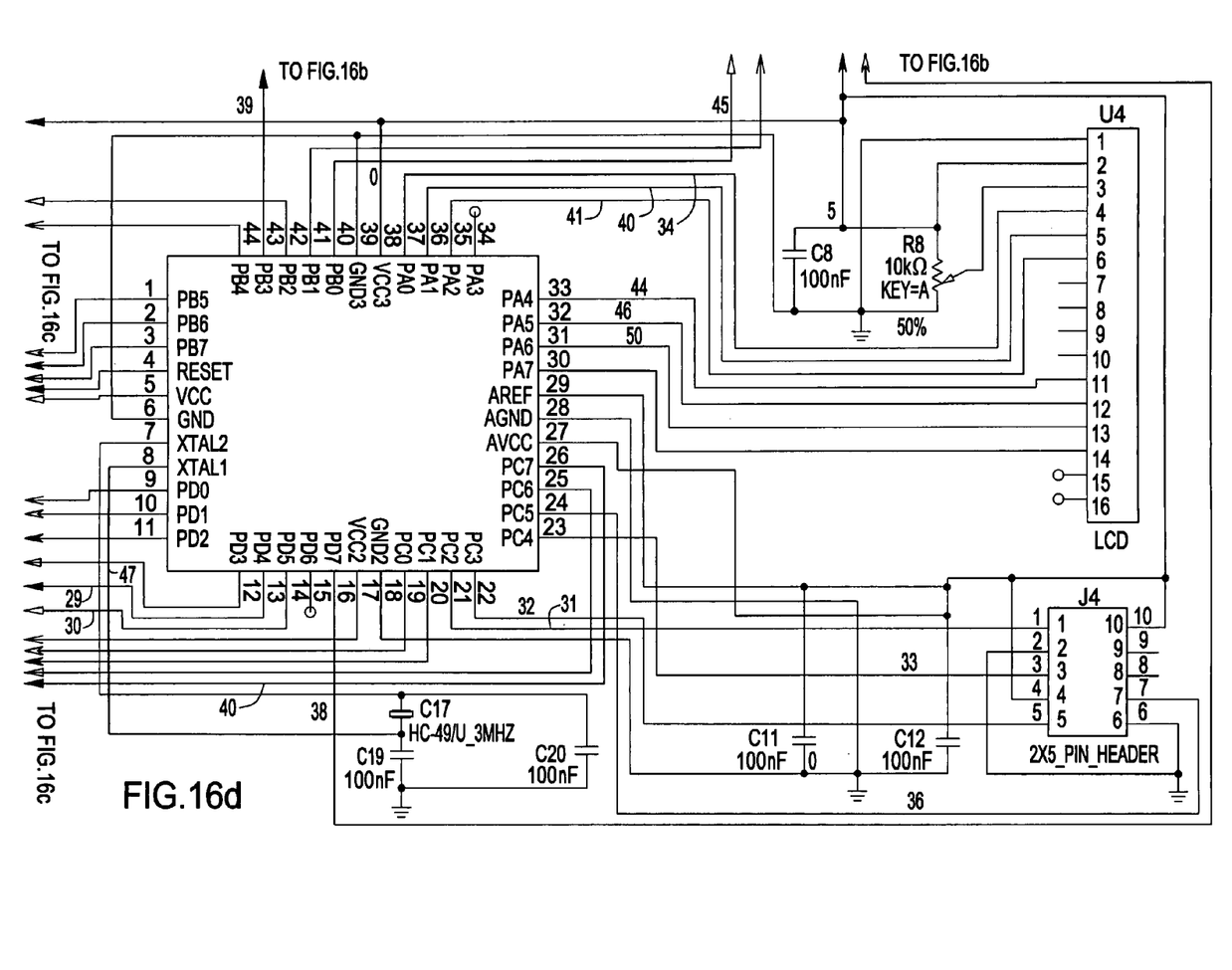

The de-bounce circuit 500 of the transmitter circuit is shown in FIG. 15. The de-bounce circuit is used to prevent the microprocessor from misinterpreting logic levels. Without this circuit the microprocessor sees multiple toggles of the I/O line and acts accordingly, see FIG. 15.

Adjustments to the calibrated airflow readings can be made by adjusting the offset and gain through the general user interface. An interface menu for the air balancer will provide the ability to read the velocity and temperature at each point throughout the construction of the unit.

A low limit can be set that forces the output to zero when the airflow rate fall below the user defined value. This is accomplished in the user interface menu. The low limit auto zero is accomplished in the microprocessor software.

The system shall operate within the temperature range of −40° F. to 180° F. Thermistors R1 and R3 comprise model QTMCC-78F by Quality Thermistors, Inc.

The numerical values shown for each component, for example resistors and capacitors, in the circuits described in this specification are examples only, and are not intended to limit the scope or application of the circuits depicted.

Figure 17:
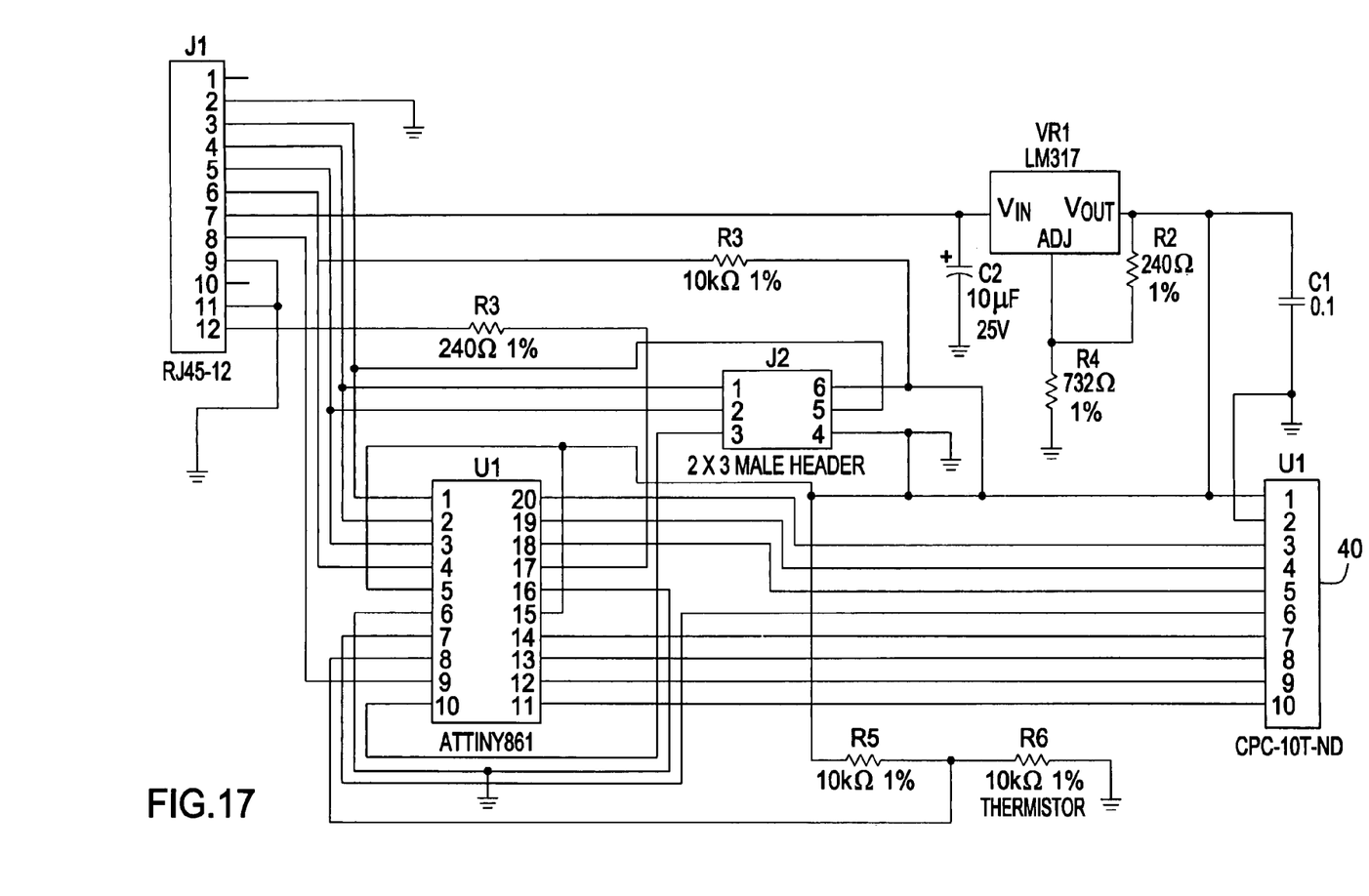
FIG. 17 is a schematic of the multiplexer circuit.

FIG. 17 is a schematic of the multiplexer circuit. Each probe 10 includes an integral multiplexing unit. Calibration data which corresponds to each thermistor 23, 24 is stored in the multiplexing unit memory. Since the calibration data is stored in this manner, the sensor pairs can be connected to the transmitter in any order or configuration. After the multiplexing unit collects the data from each sensor 23, 24, it sends a digital signal to the transmitter. The sensor circuit (FIG. 13) is connected to the multiplexer through U1.

Although a form of the invention has been described herein, it will be obvious to those skilled in the art that variations may be made in the construction and relation of parts without departing from the spirit and scope of the invention described herein.

We claim:

1. A gas measurement system comprising:
   a probe (10);
   the probe (10) comprises a sensor circuit comprising a thermal dispersion sensor (23) and a reference thermistor (24);
   the thermal dispersion sensor and the reference thermistor are disposed within a shroud (20);
   the shroud partially enclosing the thermal dispersion sensor and the reference thermistor such that a gas flow through the shroud is substantially representative of the gas flow through a gas duct;
   the probe further comprises an elongate member (27) having an aerodynamic form, the shroud is mounted to the elongate member, the elongate member mountable within the gas duct; and
   a microprocessor for receiving a signal from the thermal dispersion sensor and the reference thermistor, the microprocessor calculating and displaying a gas velocity and gas temperature.

2. The gas measurement system as in claim 1, wherein:
   the thermal dispersion sensor comprises a thermistor; and
   the thermistor comprises an epoxy coating to resist corrosion.

3. The gas measurement system as in claim 1, wherein a shroud entry area is rectangular.

4. The gas measurement system as in claim 1, wherein two or more probes are disposed within the duct.

5. The gas measurement system as in claim 1, wherein the gas duct is rectangular.

6. The gas measurement system as in claim 1, wherein the gas duct is circular.

7. The gas measurement system as in claim 1 further comprising a multiplexer circuit connected to each sensor circuit.

8. A gas measurement system comprising:

a probe (10);

the probe (10) comprises a sensor circuit comprising a first thermistor (23) and a second thermistor (24);

a multiplexer circuit is connected to each sensor circuit;

the first thermistor and the second thermistor are disposed within a shroud (20), the shroud having a rectangular entry area;

the shroud partially encloses the first thermistor and the second thermistor such that a gas flow through the shroud is substantially representative of the gas flow through a gas duct;

the probe further comprises an elongate member (27) having an aerodynamic form in cross-section with respect to a gas flow direction, the shroud is mounted to the elongate member, the elongate member mountable within the gas duct; and a microprocessor for receiving a signal from the multiplexer circuit, the microprocessor calculating and displaying a gas velocity and a gas temperature.

9. The gas measurement system as in claim 8, wherein:
the thermal dispersion sensor comprises a thermistor; and
the thermistor comprises an epoxy coating.

10. The gas measurement system as in claim 8, wherein a shroud entry area is rectangular.

11. The gas measurement system as in claim 8, wherein two or more probes are disposed within the duct.

12. The gas measurement system as in claim 8, wherein the gas duct is rectangular.

13. The gas measurement system as in claim 8, wherein the gas duct is circular.

14. A gas measurement system comprising:

a probe (10);

the probe (10) comprises a sensor circuit comprising a thermal dispersion sensor (23) and a reference thermistor (24), a multiplexer circuit connected to each sensor circuit and having calibration data for the thermal dispersion sensor;

the thermal dispersion sensor (23) and the reference thermistor (24) each comprising an epoxy coating;

the thermal dispersion sensor and the reference thermistor are disposed within a shroud (20), the shroud having a rectangular entry area;

the shroud partially encloses the thermal dispersion sensor and the reference thermistor such that a gas flow through the shroud is substantially representative of the gas flow through a gas duct;

the probe further comprises an elongate member (27) having an aerodynamic form, the shroud is mounted to the elongate member, the elongate member mountable within the gas duct; and a microprocessor for receiving a signal from the multiplexer circuit, the microprocessor calculating and displaying a gas velocity and a gas temperature.

15. The gas measurement system as in claim 14, wherein two or more probes are disposed within the duct.

16. The gas measurement system as in claim 14, wherein the gas duct is rectangular.

17. The gas measurement system as in claim 14, wherein the gas duct is circular.

* * * * *